(12) United States Patent
Majumder

(10) Patent No.: US 9,620,960 B2
(45) Date of Patent: Apr. 11, 2017

(54) CONTROL OF A STABILIZING ENERGY STORAGE IN A MICROGRID

(71) Applicant: ABB Schweiz AG, Baden (CH)

(72) Inventor: Ritwik Majumder, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/111,001

(22) PCT Filed: Jan. 13, 2014

(86) PCT No.: PCT/EP2014/050482
§ 371 (c)(1),
(2) Date: Jul. 12, 2016

(87) PCT Pub. No.: WO2015/104063
PCT Pub. Date: Jul. 16, 2015

(65) Prior Publication Data
US 2016/0329711 A1 Nov. 10, 2016

(51) Int. Cl.
*H02J 1/04* (2006.01)
*H02J 3/38* (2006.01)
(Continued)

(52) U.S. Cl.
CPC ............... *H02J 3/381* (2013.01); *H02J 3/14* (2013.01); *H02J 3/16* (2013.01); *H02J 3/38* (2013.01); *H02J 3/46* (2013.01); *Y02P 80/14* (2015.11)

(58) Field of Classification Search
CPC ..................................................... H02J 3/381
(Continued)

(56) References Cited

U.S. PATENT DOCUMENTS

| 5,977,731 A | 11/1999 | Xia et al. |
| 6,819,087 B2 | 11/2004 | Delmerico et al. |

(Continued)

FOREIGN PATENT DOCUMENTS

| CN | 102005771 A | 4/2011 |
| CN | 102244390 A | 11/2011 |

(Continued)

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

A method is performed by a control unit for controlling an energy storage configured for stabilizing a microgrid. The method includes: obtaining a local deviation signal related to a voltage and/or frequency deviation from a local reference, as measured at a local point of the microgrid where the energy storage is connected and able to inject real and/or reactive power into the microgrid for stabilizing said microgrid; obtaining a common deviation signal related to a voltage and/or frequency deviation from a common reference, as measured at a common point of the microgrid which is different from the local point, wherein the common deviation signal is configured to be identical to common deviation signal(s) obtained by other control units for controlling other energy storage(s) for stabilizing the microgrid; controlling the injection of real and/or reactive power by the energy storage into the microgrid based on the common deviation signal as long as the local deviation signal satisfies a first criterion; and switching from controlling the energy storage based on the common deviation signal to controlling the energy storage based on the local deviation signal in response to the local deviation signal satisfying a second criterion.

10 Claims, 3 Drawing Sheets

(51) Int. Cl.
*H02J 3/46* (2006.01)
*H02J 3/14* (2006.01)
*H02J 3/16* (2006.01)

(58) Field of Classification Search
USPC .......................................................... 307/35
See application file for complete search history.

(56) References Cited

U.S. PATENT DOCUMENTS

| | | | |
|---|---|---|---|
| 7,715,950 | B2 | 5/2010 | Lasseter et al. |
| 8,483,885 | B2 | 7/2013 | Oi et al. |
| 2004/0124812 | A1 | 7/2004 | Delmerico et al. |
| 2010/0025994 | A1* | 2/2010 | Cardinal ............... F03D 7/0284 290/44 |
| 2010/0207456 | A1 | 8/2010 | Lasseter et al. |
| 2012/0280673 | A1* | 11/2012 | Watanabe ............. H02J 3/1885 323/304 |
| 2013/0147441 | A1 | 6/2013 | Lee et al. |
| 2013/0168963 | A1 | 7/2013 | Garcia |
| 2014/0100705 | A1* | 4/2014 | Shi ........................ G06F 1/305 700/293 |

FOREIGN PATENT DOCUMENTS

| | | |
|---|---|---|
| CN | 102510124 A | 6/2012 |
| CN | 102570489 A | 7/2012 |
| CN | 102709946 A | 10/2012 |
| CN | 102710023 A | 10/2012 |
| CN | 102761133 A | 10/2012 |
| CN | 102842904 A | 12/2012 |
| CN | 202633970 U | 12/2012 |
| CN | 102931653 A | 2/2013 |
| CN | 102931683 A | 2/2013 |
| CN | 102983589 A | 3/2013 |
| CN | 103001223 A | 3/2013 |
| CN | 202841012 U | 3/2013 |
| CN | 103050986 A | 4/2013 |
| CN | 103066741 A | 4/2013 |
| CN | 103078340 A | 5/2013 |
| CN | 103078407 A | 5/2013 |
| CN | 103107531 A | 5/2013 |
| CN | 103117553 A | 5/2013 |
| EP | 2 515 406 | 10/2012 |
| KR | 10-2009-0029055 A | 3/2009 |
| KR | 10-1224570 B1 | 1/2013 |
| KR | 10-2013-0022039 A | 3/2013 |
| KR | 10-1264128 B1 | 5/2013 |
| KR | 10-1277185 B1 | 6/2013 |
| KR | 10-1277303 B1 | 6/2013 |
| KR | 10-1277317 B1 | 6/2013 |
| TW | 201318297 A1 | 5/2013 |
| TW | 201318300 A1 | 5/2013 |
| WO | 2013/010129 A2 | 1/2013 |

\* cited by examiner

CONTROL OF A STABILIZING ENERGY STORAGE IN A MICROGRID

TECHNICAL FIELD

The present disclosure relates to a method and a control unit for controlling an energy storage configured for stabilizing an electrical microgrid.

BACKGROUND

A microgrid is a localized grouping of electricity generation, energy storage, and loads that normally operates connected to a traditional centralized grid via a point of common coupling. Microgrids are part of the structure for so called distributed generation (DG) aiming at producing electrical power locally from many small energy sources which may be called distributed generators (DG:s) or micro sources.

In a microgrid, system stability is improved with application of energy storage for continuous real and reactive power injection that works as a stabilizer for the microgrid. The main control philosophy for such stabilizer is real and reactive power injection based on local frequency and voltage deviation, respectively. In most scenarios, a larger storage/stabilizer is economical. However, in a microgrid, depending on growth, expansion and with higher penetration of DGs, it may be required to add a new storage/stabilizer in an existing microgrid and that leads to scenarios with multiple stabilizers in the same microgrid. Moreover, a planned multiple stabilizer scenario can also be beneficial for a microgrid with critical loads and frequency dependencies. This scenario is also realistic considering the DG participation in system damping.

In an alternating current (AC) system, the frequency is the same everywhere in steady state while voltage may differ depending on the power flow. However, in a microgrid with a continuous change in DG output, load switching and low inertia, there is continuous frequency and voltage fluctuation to a small scale. And the deviations are larger during large transients (like DG fault etc.).

In an AC system, frequency and voltage stability relates to minimum oscillations and overshoot with ability to come back to initial value (or any other steady state value within acceptable deviation) after a disturbance. Thus, microgrid stability could be improved with a more tight regulation of voltage and frequency. One way of doing that would be more sensitive stabilizers e.g. higher feedback gains. Unfortunately that has negative consequences in terms of system damping limited by the grid components time constants and controller bandwidth. On the other hand, the stabilizer acting against the large disturbances must be very fast and controller action must take place promptly and accurately to eliminate the control error.

SUMMARY

It is an objective of the present invention to improve the stability of a microgrid having a plurality of energy storages acting as stabilizers by means of a novel control mechanism for controlling at least one of the energy storages.

According to an aspect of the present invention, there is provided a method performed by a control unit for controlling an energy storage configured for stabilizing a microgrid. The method comprises obtaining a local deviation signal related to a voltage and/or frequency deviation from a local reference, as measured at a local point of the microgrid where the energy storage is connected and able to inject real and/or reactive power into the microgrid for stabilizing said microgrid. The method also comprises obtaining a common deviation signal related to a voltage and/or frequency deviation from a common reference, as measured at a common point of the microgrid which is different from the local point, wherein the common deviation signal is configured to be identical to common deviation signal(s) obtained by other control units for controlling other energy storage(s) for stabilizing the microgrid. The method also comprises controlling the injection of real and/or reactive power by the energy storage into the microgrid based on the common deviation signal as long as the local deviation signal satisfies a first criterion. The method also comprises switching from controlling the energy storage based on the common deviation signal to controlling the energy storage based on the local deviation signal in response to the local deviation signal satisfying a second criterion.

According to another aspect of the present invention, there is provided a control unit for controlling an energy storage configured for stabilizing a microgrid. The control unit comprises processor circuitry, and a storage unit storing instructions that, when executed by the processor circuitry, cause the control unit to obtain a local deviation signal related to a voltage and/or frequency deviation from a local reference, as measured at a local point of the microgrid where the energy storage is connected and able to inject real and/or reactive power into the microgrid for stabilizing said microgrid. The instructions also cause the control unit to obtain a common deviation signal related to a voltage and/or frequency deviation from a common reference, as measured at a common point of the microgrid which is different from the local point, wherein the common deviation signal is configured to be identical to common deviation signal(s) obtained by other control units for controlling other energy storage(s) for stabilizing the microgrid. The instructions also cause the control unit to control the injection of real and/or reactive power by the energy storage into the microgrid based on the common deviation signal as long as the local deviation signal satisfies a first criterion. The instructions also cause the control unit to switch from controlling the energy storage based on the common deviation signal to controlling the energy storage based on the local deviation signal in response to the local deviation signal satisfying a second criterion.

According to another aspect of the present invention, there is provided a microgrid comprising a plurality of distributed generators and a plurality of loads, wherein a plurality of energy storages are connected to the microgrid for stabilizing said microgrid by being able to inject real and/or reactive power into the microgrid, at least one of said energy storages being connected to an embodiment of the control unit according to the present disclosure for being controlled by said control unit.

It is an advantage of the present invention that both a local and a common deviation signal is available for controlling the energy storage stabilizer, and that the control unit can choose which of the deviation signals to base its control of the energy storage stabilizer on. If only a local deviation signal is used for each of the energy storages for a microgrid with a plurality of energy storage stabilizers, then there is a risk that a situation will occur where the stabilizers work against each other, possibly in an escalating manner. Conversely, if only a common deviation signal is used for all stabilizers, then there is a risk that local fluctuations are not noted and attended to, even large and detrimental fluctuations. In accordance with the present invention, the control unit can control the energy storage based on either the local deviation signal or the common deviation signal, depending on the local fluctuations detected by means of the local deviation signal.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
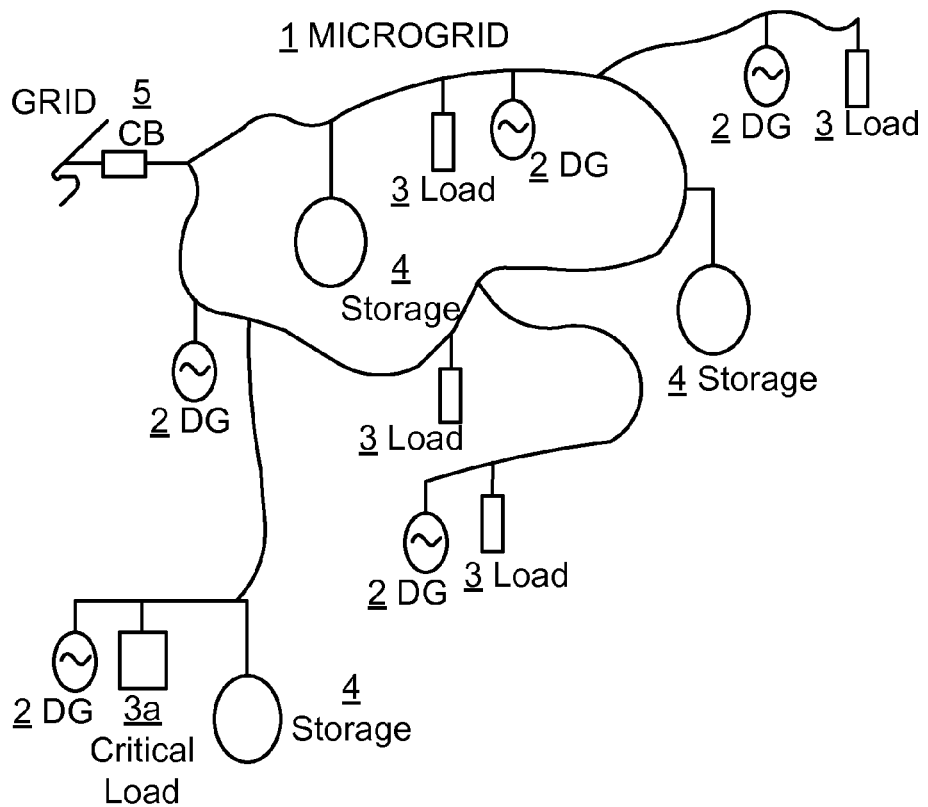
FIG. 1 is a schematic overview of an embodiment of a microgrid having a plurality of stabilizing energy storages, in accordance with the present invention.

FIG. 1 is a schematic overview of an embodiment of an AC microgrid 1 having a plurality of stabilizing energy storages 4, in accordance with the present invention. The microgrid 1 is connected to a macrogrid via a circuit breaker (CB) 5. The microgrid 1 comprises a plurality of distributed generators (DG) 2 and a plurality of loads 3 which are connected to each other via electrical conductors to form the microgrid 1. A plurality of energy storages 4 are connected to the microgrid 1 such that they are able to inject real and/or reactive power into the microgrid in order to act as stabilizers for the microgrid. Each of the storages 4 may typically comprise e.g. a battery and a converter in order to be able to inject the real and/or reactive power into the microgrid. The energy storages 4 may be positioned throughout the microgrid to stabilize different parts thereof, e.g. parts of the microgrid 1 which are especially sensitive for frequency or voltage fluctuations. For instance, one of the energy storages 4 is connected close to a critical load 3a to ensure sufficient stability for said critical load.

Figures 2A, 2B:
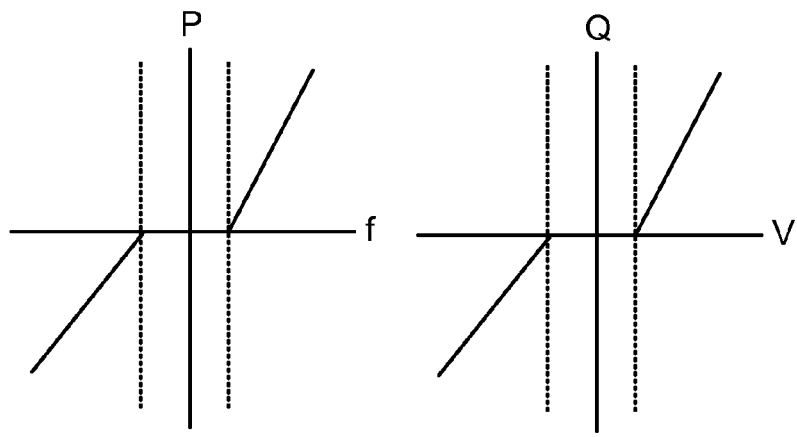
FIGS. 2a & 2b are schematic graphs illustrating power output of an embodiment of a stabilizing energy storage based on a local deviation signal, in accordance with the present invention.

FIGS. 2a & 2b are schematic graphs illustrating power output of an embodiment of a stabilizing energy storage 4 based on a local deviation signal, in accordance with the present invention. The dead band droop bandwidth is shown and the rather high feed-back gains outside the dead band bandwidth should be noted, which allows faster compensation of large frequency and voltage deviations at local disturbances with higher real (also called active) and reactive power injection. The droop curves are here shown linear in accordance with some embodiments, but in some other embodiments they may be non-linear, as would be understood by a person skilled in the art.

Figure 3:
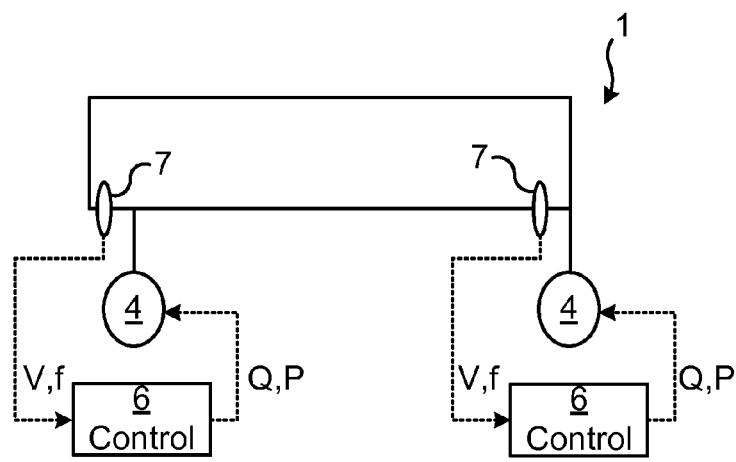
FIG. 3 is a schematic circuit diagram for controlling stabilizing energy storages based on local deviation signals in an embodiment of a microgrid, in accordance with the present invention.

FIG. 3 is a schematic circuit diagram for controlling stabilizing energy storages 4 based on local deviation signals V & f in an embodiment of a microgrid 1, in accordance with the present invention. A control unit 6 is connected to each of the two energy storages 4 shown in the figure for control thereof. The control unit 6 receives frequency (f) and voltage (V) measurements from a local point 7, which measurements the control unit can use to obtain the local deviation signal by comparing with the local reference values for f and V. The local point 7 is a point in the microgrid 1 which is at (e.g. close to) the point where the energy storage 4 is connected to the microgrid 1, i.e. where the energy storage can inject power into the microgrid, to be able to stabilize the microgrid at said local point 7 while disregarding the situation elsewhere in the microgrid. Based on the measurements and the thus obtained local deviation signal, the control unit 6 can send a control signal to the energy storage 4 instructing it to continuously, regularly or as needed inject a specified amount of real power (P) and/or a specified amount of reactive power (Q) into the microgrid 1 to locally control the frequency and voltage of the microgrid.

Figure 4:
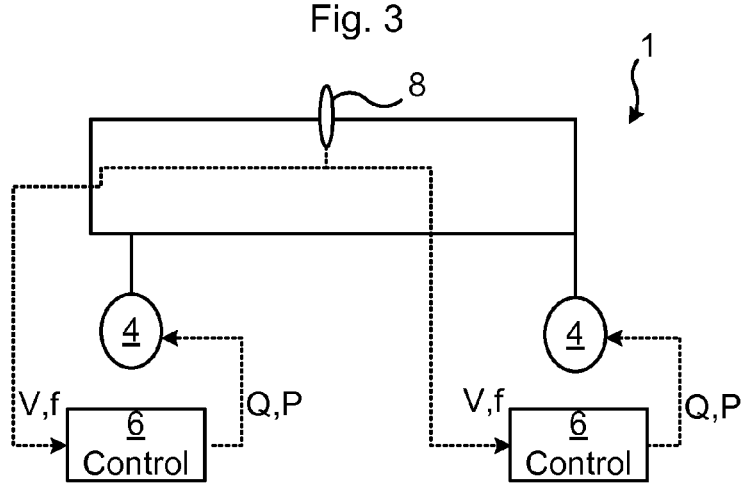
FIG. 4 is a schematic circuit diagram for controlling stabilizing energy storages based on a common deviation signal in an embodiment of a microgrid, in accordance with the present invention.

FIG. 4 is a schematic circuit diagram for controlling stabilizing energy storages 4 based on a common deviation signal in an embodiment of a microgrid 1, in accordance with the present invention. The figure illustrates a situation similar to FIG. 3 but with the use of a common deviation signal instead of local deviation signals. A control unit 6 is connected to each of the two energy storages 4 shown in the figure for control thereof. Both the control units 6 receive frequency (f) and voltage (V) measurements from a common point 8, which measurements each of the control units can then use to obtain the common deviation signal by comparing with the common reference values for f and V. The common point 8 is a point in the microgrid 1 which is typically not at the point where the energy storage 4 is, or any of the energy storages are, connected to the microgrid 1. Instead, the common point, which is used for both energy storages 4 in the figure, may e.g. be at the centre of the microgrid 1 or at a critical load 3 which does not have an energy storage 4 close enough to stabilize it locally. Based on the measurements and the thus obtained common deviation signal, the control unit 6 can send a control signal to the energy storage 4 instructing it to continuously, regularly or as needed inject a specified amount of real power (P) and/or a specified amount of reactive power (Q) into the microgrid 1 to more generally control the frequency and voltage of the overall microgrid 1.

Figures 5A, 5B:
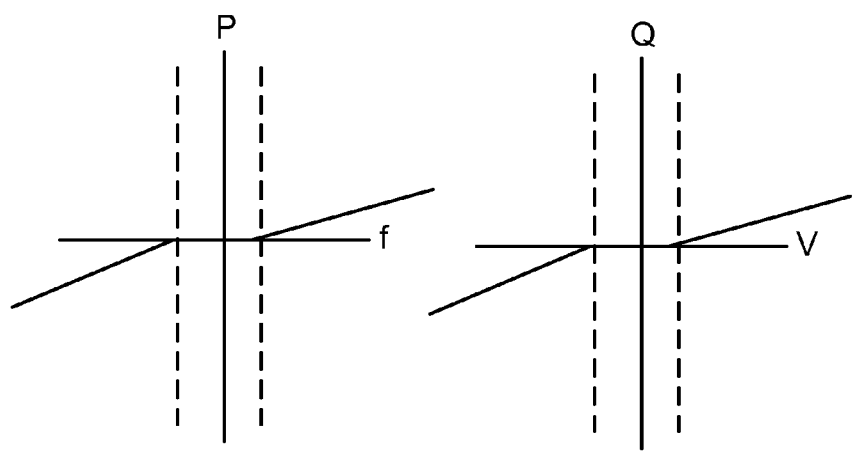
FIGS. 5a & 5b are schematic graphs illustrating power output of an embodiment of a stabilizing energy storage based on a common deviation signal, in accordance with the present invention.

FIGS. 5a & 5b are schematic graphs illustrating power output of an embodiment of a stabilizing energy storage 4 based on a common deviation signal, in accordance with the present invention. A tighter regulation with continuous variation in frequency and voltage can be achieved with a common deviation signal. A lower feedback gain ensures slower control unit action and avoids unnecessary control efforts, as is shown in FIGS. 5a and 5b. The droop curves are here shown linear in accordance with some embodiments, but in some other embodiments they may be non-linear, as would be understood by a person skilled in the art.

Figure 6:
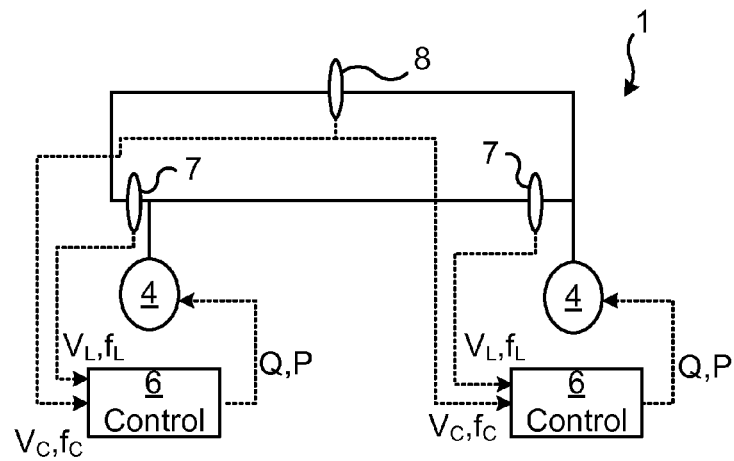
FIG. 6 is a schematic circuit diagram for controlling stabilizing energy storages based on both a common deviation signal and on local deviation signals in an embodiment of a microgrid, in accordance with the present invention.

FIG. 6 is a schematic circuit diagram for controlling stabilizing energy storages 4 based on both a common deviation signal and on local deviation signals in an embodiment of a microgrid 1, in accordance with the present invention. In accordance with the present invention, the stabilizing energy storage 4 can be controlled either on the local deviation signal as illustrated in FIG. 3 or on the common deviation signal as illustrated in FIG. 4. Whether to use the local or common deviation signal is decided by the control unit 6 based on the local measurements. Typically, regular operation is use of the common deviation signal, while the local deviation signal is used when the magnitude of the local deviation is above a threshold or the rate of magnitude change of the local deviation is above a threshold (e.g. rapid/large fluctuations/oscillations). Then, the common deviation signal may be used again when the magnitude of the local deviation is below another threshold or the rate of magnitude change of the local deviation is below another threshold. The different thresholds for magnitude or rate, respectively, should not be too close together to avoid rapid switching between using local and common deviation signals. Thus, a magnitude threshold for switching from common to local deviation signal should be sufficiently above a magnitude threshold for returning to using the common deviation signal. Similarly, a rate of change threshold for switching from common to local deviation signal should be sufficiently above a rate of change threshold for returning to using the common deviation signal. Similarly, detection of a communication failure or a communication delay above a predetermined threshold may prompt the control unit 6 to switch to using the local deviation signal of voltage and frequency. It should be noted that the switching from using common deviation signal to using local deviation signal may be a local decision made by a control unit 6 and only relevant to the energy storage or energy storages 4 controlled by that control unit 6. Other energy storages of the microgrid may continue using the common deviation signal. In the figure, the local deviation signal for the voltage is denoted $V_L$ and the local deviation signal for the frequency is denoted $f_L$, for the local points 7, while the common deviation signal for the voltage is denoted $V_C$ and the common deviation signal for the frequency is denoted $f_C$, for the common point 8.

Figure 7:
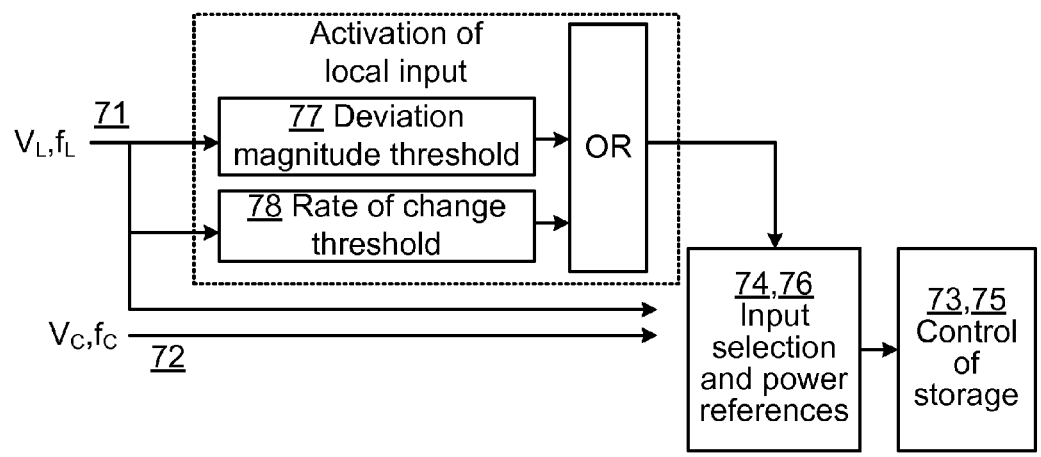
FIG. 7 is a schematic flow chart illustrating different embodiments of a method of controlling a stabilizing energy storage, in accordance with the present invention.

FIG. 7 is a schematic flow chart illustrating different embodiments of a method of controlling a stabilizing energy storage 4, in accordance with the present invention. The method is performed in/by a control unit 6 as discussed herein. A local deviation signal ($V_L$, $f_L$) is obtained 71, related to a voltage and/or frequency deviation from a local reference, as measured at a local point 7 of the microgrid 1 where the energy storage 4 is able to inject real and/or reactive power (Q, P) into the microgrid for stabilizing said microgrid. Typically at the same time, a common deviation signal ($V_C$, $f_C$) is obtained 72, related to a voltage and/or frequency deviation from a common reference, as measured at a common point 8 of the microgrid which is different from the local point 7, wherein the common deviation signal is configured to be identical to common deviation signal(s) obtained by other control units 6 for controlling other energy storage(s) 4 for stabilizing the microgrid 1. The local deviation signal is checked against the predefined deviation magnitude threshold 77 and the predefined rate of change threshold 78. Based on these checks, the control unit 6 decides whether to switch 74 to using the local deviation signal for controlling the energy storage 4 (if the common deviation signal is currently used 73 for controlling the energy storage) or whether to return 76 to using the common deviation signal for controlling the energy storage 4 (if the local deviation signal is currently used 75 for controlling the energy storage).

In accordance with some embodiments of the present invention, the obtaining 71 a local deviation signal comprises receiving voltage and/or frequency measurements from the local point 7 and comparing them to the local reference which is predefined and held in a storage unit of the control unit 6 to calculate the local deviation signal. Similarly, the obtaining 72 a common deviation signal may comprise receiving voltage and/or frequency measurements from the common point 8 and comparing them to the common reference which is predefined and held in a storage unit of the control unit 6 to calculate the common deviation signal. Alternatively, the control unit 6 receives the local and/or common deviation signals which have been calculated elsewhere.

In accordance with some embodiments of the present invention, the first criterion is that the deviation from the local reference is below a predefined magnitude threshold 77 or that a change rate of the deviation from the local reference is below a predefined rate of change threshold 78.

In accordance with some embodiments of the present invention, the second criterion is that the deviation from the local reference is above a predefined magnitude threshold 77 or that the change rate of the deviation from the local reference is above a predefined rate of change threshold 78. The magnitude threshold 77 and/or the rate of change threshold 78 may be the same or different from any magnitude and rate of change thresholds used for the first criterion.

In accordance with some embodiments of the present invention, the method further comprises returning 76 from controlling 75 the energy storage 4 based on the local deviation signal to controlling 73 the energy storage based on the common deviation signal in response to the local deviation signal satisfying a third criterion. In some embodiments, the third criterion is that the deviation from the local reference is below a predefined magnitude return threshold 77 or that a change rate of the deviation from the local reference is below a predefined rate of change return threshold 78.

Some advantages of different embodiments of the present invention include:

An advantage of using the common deviation signal is tighter regulation and it helps the storages 4, as controlled by the control unit 6, to act for a common goal together (minimize control effort). That is used during normal operation with small disturbances.

During larger disturbances, the storages 4, as controlled by the control unit 6, may act based on local deviation signal (outside an acceptable deviation) to provide the much needed support to the local loads, avoids tripping etc.

Selective Operation: This can ensure each storage participation in whole microgrid support as well as emergency operation for a critical load. It can provide a scenario where any storage 4, as controlled by the control unit 6, can participate in a grid wide solution or decentralized support to the local loads.

Segmented Operation: It may be possible to use a storage 4, as controlled by the control unit 6, in the whole microgrid operation as well as in segmented microgrid operation.

It is possible to provide support by an energy storage 4, as controlled by the control unit 6, at a critical point in the microgrid 1 before the deviation reaches the local loads.

Below follow another aspect of the present invention.

According to an aspect of the present invention, there is provided a control unit 6 for controlling an energy storage 4 configured for stabilizing a microgrid 1, the control unit comprising: means for obtaining 71 a local deviation signal $V_L$, $f_L$ related to a voltage and/or frequency deviation from a local reference, as measured at a local point 7 of the microgrid 1 where the energy storage 4 is connected and able to inject real and/or reactive power Q, P into the microgrid for stabilizing said microgrid; means for obtaining 72 a common deviation signal $V_C$, $f_C$ related to a voltage and/or frequency deviation from a common reference, as measured at a common point 8 of the microgrid which is different from the local point 7, wherein the common deviation signal is configured to be identical to common deviation signal(s) obtained by other control units 6 for controlling other energy storage(s) 4 for stabilizing the microgrid 1; means for controlling 73 the injection of real and/or reactive power by the energy storage 4 into the microgrid 1 based on the common deviation signal as long as the local deviation signal satisfies a first criterion; and means for switching 74 from controlling 73 the energy storage 4 based on the common deviation signal to controlling 75 the energy storage based on the local deviation signal in response to the local deviation signal satisfying a second criterion.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by control units, each for controlling a respective energy storage, configured for stabilizing a microgrid, the method comprising each of the control units:

obtaining a local deviation signal related to a voltage and/or frequency deviation from a local reference, as measured at a local point of the microgrid where the energy storage is connected and able to inject real and/or reactive power into the microgrid for stabilizing said microgrid;

obtaining a common deviation signal related to a voltage and/or frequency deviation from a common reference, as measured at a common point of the microgrid which is different from the local point, wherein the common deviation signal is identical for all the control units;

controlling the injection of real and/or reactive power by the energy storage into the microgrid based on the common deviation signal as long as the local deviation signal satisfies a first criterion;

switching from controlling the energy storage based on the common deviation signal to controlling the energy storage based on the local deviation signal in response to the local deviation signal satisfying a second criterion; and returning from controlling the energy storage based on the local deviation signal to controlling the energy storage based on the common deviation signal in response to the local deviation signal satisfying a third criterion.

2. The method of claim 1, wherein:

the obtaining a local deviation signal comprises receiving voltage and/or frequency measurements from the local point and comparing them to the local reference which is predefined and held in a storage unit of the control unit to calculate the local deviation signal; and the obtaining a common deviation signal comprises receiving voltage and/or frequency measurements from the common point and comparing them to the common reference which is predefined and held in a storage unit of the control unit to calculate the common deviation signal.

3. The method of claim 2, wherein the first criterion is that the deviation from the local reference is below a predefined magnitude threshold or that a change rate of the deviation from the local reference is below a predefined rate of change threshold.

4. The method of claim 2, wherein the third criterion is that the deviation from the local reference is below a predefined magnitude return threshold or that a change rate of the deviation from the local reference is below a predefined rate of change return threshold.

5. The method of claim 1, wherein the first criterion is that the deviation from the local reference is below a predefined magnitude threshold or that a change rate of the deviation from the local reference is below a predefined rate of change threshold.

6. The method of claim 5, wherein the second criterion is that the deviation from the local reference is above the predefined magnitude threshold or that the change rate of the deviation from the local reference is above the predefined rate of change threshold.

7. The method of claim 6, wherein the third criterion is that the deviation from the local reference is below a predefined magnitude return threshold or that a change rate of the deviation from the local reference is below a predefined rate of change return threshold.

8. The method of claim 5, wherein the third criterion is that the deviation from the local reference is below a predefined magnitude return threshold or that a change rate of the deviation from the local reference is below a predefined rate of change return threshold.

9. The method of claim 1, wherein the third criterion is that the deviation from the local reference is below a predefined magnitude return threshold or that a change rate of the deviation from the local reference is below a predefined rate of change return threshold.

10. A microgrid comprising a plurality of distributed generators, a plurality of energy storages, a plurality of control units and a plurality of loads, wherein the plurality of energy storages are connected in the microgrid for stabilizing said microgrid by being able to inject real and/or reactive power into the microgrid, each of said energy storages being connected to a respective control unit of the plurality of control units, each control unit comprising:

processor circuitry; and a storage unit storing instructions that, when executed by the processor circuitry, cause the control unit to:
obtain a local deviation signal related to a voltage and/or frequency deviation from a local reference, as measured at a local point of the microgrid where the energy storage of the control unit is connected;
obtain a common deviation signal related to a voltage and/or frequency deviation from a common reference, as measured at a common point of the microgrid which is different from the local point, wherein the common deviation signal is identical for all the control units;
control the injection of real and/or reactive power by the energy storage into the microgrid based on the common deviation signal as long as the local deviation signal satisfies a first criterion;
switch from controlling the energy storage based on the common deviation signal to controlling the energy storage based on the local deviation signal in response to the local deviation signal satisfying a second criterion; and
return from controlling the energy storage based on the local deviation signal to controlling the energy storage based on the common deviation signal in response to the local deviation signal satisfying a third criterion.

* * * * *